3,525,692
OLEOPHILIC GRAPHITE AND HEAVY
METAL SULPHIDES
Stanley Charles Dodson, Leatherhead, Surrey, and Roger
John Russell Cairns, Camberley, Surrey, England, assignors to The British Petroleum Company Limited,
London, England
No Drawing. Filed Aug. 20, 1968, Ser. No. 753,866
Claims priority, application Great Britain, Sept. 5, 1967,
40,445/67
Int. Cl. C10m 5/02
U.S. Cl. 252—29
3 Claims

ABSTRACT OF THE DISCLOSURE

In order to cut down metal wear debris formed by the grinding mill when grinding graphite to form oleophilic graphite a load-carrying additive, e.g. zinc dialkyl dithiophosphate is added to the grinding medium.

---

This invention relates to oleophilic compounds, particularly it relates to an improved method of preparing oleophilic compounds.

The materials which can be used in the method of the present invention are graphite and metal sulphides.

Oleophilic graphite has a heat of adsorption of n-dotriacontane from n-heptane of at least 700 millicalories per gram and heat of adsorption of n-butanol from n-heptane of less than 200 millicalories per gram.

Oleophilic metal sulphides have a ratio of heat of adsorption of n-dotriacontane from n-heptane to heat of adsorption of n-butanol from n-heptane of at least 1:2 preferably at least 1:1 and most preferably at least 2:1.

Satisfactory products can be obtained by grinding in most organic liquids but it is desirable to use one the bulk of which can be easily removed from the oleophilic graphite. Those liquids distilling below 500° C. and having a viscosity below 600 centistokes at 100° F. (38° C.) are therefore preferred. Liquids having a surface tension below 72 dynes/cm., preferably from 10 to 40 dynes/cm., at 25° C. are preferred.

Suitable organic liquids are lower molecular weight hydrocarbons, including straight-chain or branched-chain, saturated or unsaturated aliphatic, saturated or unsaturated, subsituted or unsubsituted, cycloalkyl, and substituted or unsubstituted aromatic compounds. Examples of such compounds are n-heptane, octene-2, 2,2,4-trimethylpentane, cyclohexane, benzene or toluene. Branched aliphatic compounds are particularly preferred. Other suitable organic liquids are those compounds which contain fluorine, chlorine, or phosphorus and chlorine, for example, carbon tetrachloride.

Other suitable organic liquids are the polar oxygen compounds such as isopropyl alcohol. Silicone fluids can also be used.

For best results, the amount of graphite in the graphite/organic liquid mixture should not exceed 50% wt.; preferably it should be from 2 to 20% wt.

The grinding may be carried out in any suitable grinding mill or device and it is desirable to continue the grinding until an oleophilic graphite having a surface area (as determined by nitrogen adsorption) of from 20 to 800, preferably from 30 to 200, square metres per gram is obtained. Usually this can be achieved by grinding at normal temperatures for the required period but the temperature of the mixture may be artificially increased if desired, for example, up to 400° C. In this case, liquids which have viscosities up to 600 centistokes at 100° F. (38°) may be used, for example, mineral lubricating oils, ranging from "spindle" oils to "bright stocks."

One of the quickest and most effective techniques is to carry out the grinding in a vibratory ball mill. Preferably the mill has an amplitude of vibration of at least 2 mm. and a frequency of at least 1500 cycles per minute. It is important to exclude air so far as possible during the grinding operation.

When using a ball mill, it is of course desirable to use balls made of a material which does not react with the graphite and which does not wear unduly during the grinding. Vibratory ball mills usually contain steel balls and these are suitable for the present purpose. It is preferred to use a hard grade of steel for the balls.

A magnetic filter can be used to remove small ferrous particles from the slurry. A circulatory system can also be used wherein the slurry is pumped through an external magnetic filter and then returned to the mill.

The slurry of oleophilic graphite can be separated from the balls by sieving or by displacement by another liquid and sieving.

If a relatively high boiling organic liquid is used for grinding it is preferred to displace this liquid by a low boiling liquid. This liquid can then be removed by boiling from the slurry. It is preferred to use vigorous boiling.

It is also possible to filter the slurry to obtain a filter cake of oleophilic graphite.

In either case it is preferred to remove the last traces of solvent by heating the filter cake in a vacuum oven for several hours, for example, at 100° C. and at 1 mm. mercury.

When the oleophilic graphite is to be used as a grease thickener the following method of grinding described in is preferred. This method comprises a continuous or semi-continuous preparation in which a grinding fluid and/or a mineral or synthetic base oil and the materials to be ground are passed through the grinding mill and the resultant slurry is passed through a magnetic filter before it is passed to further processing steps.

Oleophilic compounds have lubricating properties and have many uses in greases, dispersions and solid composites. It is important that, when oleophilic compounds are used, they should not contain any impurities of a hard or abrasive nature.

It has been found that, when oleophilic compounds have been produced by grinding in a vibration mill using hard steel balls in mild steel chambers there is a tendency for small ferrous particles to be mixed with the oleophilic compound produced. The presence of wear debris in the oleophilic compound is naturally undesirable and the problem had been dealt with by using hardened steel balls and a case-hardened grinding chamber. Magnetic filteration may also be used.

We have now found that the addition of a load-carrying additive for lubricants to the grinding medium used in the preparation of oleophilic materials reduces the amount of wear debris in the oleophilic material.

According to the invention there is provided a method of preparing an oleophilic graphite or an oleophilic metal sulphide which comprises grinding the graphite or metal sulphide in an organic grinding fluid in the presence of load-carrying additive for lubricants, to a surface area of at least 20 square metres per gram.

Load-carrying additives are well known additives used in lubricating compositions. Their function is to improve the anti-wear and/or extreme pressure properties of lubricating compositions, i.e. to reduce the amount of wear and to prevent seizure of bodies lubricated by lubricating compositions.

The organic load-carrying additives which can be used in the present invention include the compounds containing elements of Groups V–B, VI–B or VII–B of the Periodic Table and specifically, phosphorus, sulphur or a halogen.

Examples of suitable load-carrying additives are organic chlorine-containing compounds such as the low-molecular weight chlorinated hydrocarbons, preferably those containing from 1–4 carbon atoms, e.g. carbon tetrachloride; chlorbenzyl esters of alkyl xanthic acids and of thioacids such as thiocarbonic acid; and chlorinated hydrocarbon waxes.

Other suitable load-carrying additives are the co-valent sulphur-containing compound such as the di-phenol polysulphides, e.g. di-(4-hydroxy phenol) polysulphide; alkyl and aryl thioethers; alkyl and aryl thiocarbonates and thiocarbamates; sulphur-substituted carboxylic acid esters, e.g. acetic esters substituted in the $\alpha$-position by sulphur; sulphurised polymers, e.g. sulphurised butadiene-1,3/styrene copolymer; the reaction product of sulphur and polyalkylene glycols; alkyl disulphides, e.g. di-n-butyl disulphide and di-(2-ethyl hexyl) disulphide; and di-aryl disulphides, e.g. di-benzyl disulphide and di-(amino benzyl) disulphide.

Further suitable load-carrying additives are the phosphosulphized organic compounds. Typical organic materials which can be phosphosulphurized include oxygen containing waxes; chlorinated phenols; waxy esters; cyclic ketones; hydrogenated sperm oil; esters of unsaturated acids, e.g. glycol and glyceryl oleates; and abietic esters.

Yet further suitable load-carrying additives are organic compounds containing phosphate or thiophosphate groups such as tri-aromatic phosphates, e.g. tri-cresyl phosphate; trialkyl phosphates such as tributyl phosphate; and metal dialkyl dithiophosphates such as the zinc dialkyl dithiophosphates.

Organo metallic compounds such as organo-tin dithiophosphates and lead naphthenate can be also used as load-carrying additives.

Compounds containing nitrogen which can be used include phosphoramidates, for example those described in U.K. Pat. 899,101; nitrobenzenes; nitronaphthalenes; amino phosphates; tetra alkyl ammonium phosphates and thiophosphates; and rhodanine and rhodanine derivatives.

The method of preparation of the oleophilic compounds of the present invention is especially useful in the preparation of oleophilic compounds which are to be used as grease thickeners.

The load-carrying additives used in the present invention can be added to the grinding medium in an amount up to 100% wt. and preferably from 5% wt. to 50% based on the weight of oleophilic material. The load-carrying additive can be chosen so that its properties are especially suited for the use to which the oleophilic material is to be put. For example when the oleophilic material is to be used as a grease thickener, zinc dithiophosphates are preferred load-carrying additives as they have anticorrosion and antioxidation properties in addition to their load-carrying properties.

EXAMPLE

The effect of grinding graphite in a petroleum ether (boiling range 70° to 90° C.) in the presence of a load-carrying additive is shown in the following table.

The grinding mill used was a VM25 vibratory ball mill made by G.E.C. Limited, the grinding was carried out for 8 hours, and chambers of mild steel and case hardened steel were used. The amplitude of vibration was 4 mm. and the frequency of vibration was 3000 cycles per minute.

The slurry was circulated through a magnetic filter in all cases.

TABLE 1

| Material from which the chambers are made | Time of grinding, hrs. | Anti-wear additive | Wear debris as percent wt. of iron on graphite |
|---|---|---|---|
| Mildsteel | 10 | None | 3.17 |
| Do | 8 | do | 2.5 |
| Do | 9 | A | 0.64 |
| Do | 8 | A | 0.47 |
| Do | 8 | B | 1.0 |
| Hardened steel | 12 | None | 0.23 |
| Do | 12 | A | 0.022 |

Additive A is a commercial zinc dialkyl dithiophosphate sold under the trade name Lubrizol 1097 and Additive B is a chlorinated paraffin sold under the trade name Ceroclor 42.

13% by weight of the additive A based on the weight of graphite was used and

33% by weight of the additive B based on the weight of graphite was used.

What we claim is:

1. A process of producing oleophilic compounds selected from graphite and heavy metal sulphides which comprises forming a mixture which consists of less than 50% by wt. of a compound selected from graphite and heavy metal sulphides in an organic liquid distilling below 500° C., having a viscosity below 600 centistokes at 38° C., and having a surface tension below 72 dynes/cm. at 25° C., grinding said mixture in the presence of an organic load-carrying agent which contain one or more elements selected from the group consisting of chlorine, sulphur, phosphorous and nitrogen until said compound becomes oleophilic and has a surface area of from 20 to 800 square meters per gram.

2. An oleophilic compound selected from graphite and heavy metal sulphides produced by the process of claim 1.

3. A lubricating composition consisting of a lubricating oil containing an effective amount of an oleophilic compound produced by the process of claim 1.

References Cited

UNITED STATES PATENTS 3,384,584   5/1968   Groszek _____ 252—25

DANIEL E. WYMAN, Primary Examiner

I. VAUGHN, Assistant Examiner

U.S. Cl. X.R.

23—134, 209.1, 209.2; 252—25, 32.7